United States Patent
Tsujino

(10) Patent No.: US 7,420,612 B2
(45) Date of Patent: Sep. 2, 2008

(54) DIGITAL CAMERA

(75) Inventor: Kazuhiro Tsujino, Osaka (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 654 days.

(21) Appl. No.: 10/220,288

(22) PCT Filed: Mar. 7, 2001

(86) PCT No.: PCT/JP01/01791

§ 371 (c)(1),
(2), (4) Date: Sep. 10, 2002

(87) PCT Pub. No.: WO01/67748

PCT Pub. Date: Sep. 13, 2001

(65) Prior Publication Data

US 2003/0030740 A1    Feb. 13, 2003

(30) Foreign Application Priority Data

Mar. 10, 2000    (JP) .............................. 2000-066396

(51) Int. Cl.
H04N 5/238 (2006.01)
H04N 5/225 (2006.01)
H04N 5/232 (2006.01)
(52) U.S. Cl. ..................... 348/365; 348/354; 348/345
(58) Field of Classification Search .............. 348/221.1, 348/354, 365
See application file for complete search history.

(56) References Cited

U.S. PATENT DOCUMENTS

| 4,812,912 | A | * | 3/1989 | Iida et al. ..................... 348/346 |
| 6,614,477 | B1 | * | 9/2003 | Lee et al. ..................... 348/312 |
| 6,657,668 | B1 | * | 12/2003 | Hata ........................... 348/349 |
| 6,972,799 | B1 | * | 12/2005 | Hashimoto ................... 348/350 |
| 2004/0066461 | A1 | * | 4/2004 | Maeda .................. 348/333.12 |

FOREIGN PATENT DOCUMENTS

| CN | 200410069070.9 | 2/2008 |
| JP | 63-281582 | 11/1988 |
| JP | 3-73681 | 3/1991 |
| JP | 09-312797 | 12/1997 |
| JP | 10-239579 | 9/1998 |
| JP | 11-298783 | 10/1999 |
| WO | WO 98/52351 | 11/1998 |

OTHER PUBLICATIONS

English Translation of JP 63-281582 which was cited in Applicants IDS submitted Sep. 10, 2002.*

* cited by examiner

*Primary Examiner*—Lin Ye
*Assistant Examiner*—Dillon Durnford-Geszvain
(74) *Attorney, Agent, or Firm*—Westerman, Hattori, Daniels & Adrian, LLP.

(57) ABSTRACT

A digital camera includes a CCD imager. If brightness of an object is not enough, a frame rate of the CCD imager at a time of a focus adjustment is changed from 30 fps to 15 fps. This also lowers a reading speed of a camera signal, and reduces noise included in the camera signal. An AF evaluation value is acquired by integrating a high frequency component of a Y signal generated on the basis of the camera signal, and therefore, high noise causes an error in the AF evaluation value and fails to correctly adjust focus. This is the reason why the driving speed of the CCD imager is lowered when the brightness of the object is not enough.

15 Claims, 12 Drawing Sheets

DIGITAL CAMERA

TECHNICAL FIELD

The present invention relates to a digital camera reading an image signal generated by a photoelectronic conversion in the image sensor therefrom.

More specifically, the present invention relates to a digital camera adjusting focus on the basis of a high frequency component of an image signal corresponding to an object image photographed by an image sensor.

PRIOR ART

In a digital camera, an object is exposed to an image sensor such as a CCD imager, and an image signal generated by a photoelectronic conversion at a light-receiving element is read from the image sensor in response to a vertical transfer pulse and a horizontal transfer pulse. A photographing condition such as focus is adjusted on the basis of the image signal output from the image sensor. Specifically, a high frequency luminance component of the image signal is integrated, and a position of a focus lens is adjusted so that an integrated value becomes a maximum value. However, in a prior art, there is a problem that since frequency of a clock to drive the image sensor is fixed, as the frequency becomes high, high noise is included in the image signal. Furthermore, there is a problem that the noise gives negative effect on the integrated value of the high frequency luminance component, and therefore, it is impossible to precisely adjust the focus.

SUMMARY OF THE INVENTION

Therefore, it is a primary object of the present invention to provide a digital camera capable of reducing noise included in an output of an image sensor.

Another object of the present invention is to provide a digital camera capable of precisely adjusting focus.

A digital camera according to the present invention comprises: an image sensor for generating an image signal by photoelectronically converting an optical image of an object; an exposing means for exposing the image sensor in response to a timing signal every predetermined time period; a reading means for reading the image signal generated by exposure of the exposing means from the image sensor at a first speed corresponding to the predetermined time period; a processing means for performing a predetermined process on the basis of the image signal read by the reading means; an instructing means for instructing a photographing of a desired object; and a first changing means for changing a reading speed of the reading means to a second speed lower than the first speed when reading the image signal of the desired object.

The image sensor is exposed in response to the timing signal every predetermined time period, and the image signal generated by the exposure is read from the image sensor at the first speed corresponding to the predetermined time period. The read image signal is utilized for a predetermined process. When the desired object is instructed to be photographed, the reading speed by the reading means is changed from the first speed to the lower second speed. The image signal of the desired object is read from the image sensor at the second speed.

The first speed is in correspondence to the above-described predetermined time period and faster than the second speed. That is, a period of the timing signal corresponding to the first speed is shorter than around of the timing signal corresponding to the second speed. Thus, a time from an input of the photographing instruction to exposure of the desired object is made shorter than a time when the timing signal is generated every period corresponding to the second speed. As a result, a responsive characteristic is improved. Furthermore, by reading the image signal of the desired object at the second speed lower than the first speed, noise included in the image signal can be reduced.

In one example of the present invention, the processing means includes an adjusting means for adjusting a photographing condition on the basis of the image signal read at the first speed, and a recording means for recording the image signal read at the second speed. Specifically, the image signal is read at the first speed when adjusting the photographing condition and whereby, the adjustment of the photographing condition is completed in a short time. On the other hand, the image signal read at the second speed, i.e., the image signal of the desired object in which noise is reduced is recorded by a recording means.

In another example of the present invention, the processing means includes a generating means for generating a display image signal to be displayed on a display on the basis of the image signal read by the reading means. Accordingly, when the image signal is read at the first speed, a motion image is displayed on the display, and when the image signal is read at the second speed, a still image of the desired object is displayed on the display.

In the other example of the present invention, the photographing instruction includes a main-exposure instruction, and the exposing means implements the main-exposure in response to a timing signal immediately after an input of the main-exposure instruction. The main-exposure is soon executed after the main-exposure instruction.

In further example of the present invention, the second speed is one-Nth (N: integer more than 2) of the first speed.

In another example of the present invention, the image signal read from the image sensor is subject to correlative double sampling by a sampling means at a third speed. It is noted that when the reading speed is changed by the first changing means, a second changing means changes a sampling speed to a fourth speed lower than the third speed.

A digital camera according to the present invention comprises: an image sensor driven at a predetermined speed for photographing an object; a detecting means for detecting a high-frequency component of an image signal of the object photographed by the image sensor; an adjusting means for adjusting focus on the basis of the high-frequency component; a determining means for determining whether or not brightness of the object is enough; and a reducing means for reducing a driving speed of the image sensor when the brightness is not enough.

When the object is photographed by the image sensor, the high-frequency component of the image signal of the photographed object is detected by the detecting means. The focus is adjusted by the adjusting means on the basis of the detected high-frequency component. On the other hand, the determining means determines whether or not the brightness of the object is enough, and if the brightness is not enough, the reducing means reduces the driving speed of the image sensor.

High noise in the image signal causes high noise in the high-frequency brightness component utilized in the focus adjustment, and therefore, it is impossible to precisely adjust the focus. This is the reason why the driving speed of the image sensor is reduced when the brightness of the object is not enough. Thus, it is possible to prevent the high-frequency component from being influenced by noise, and it is possible to precisely adjust the focus.

In one example of the present invention, an exposure related parameter in which an optimal exposure amount is obtained is calculated by a calculating means. The determining means determines the brightness by comparing the exposure related parameter with a predetermined threshold value.

The above described objects and other objects, features, aspects and advantages of the present invention will become more apparent from the following detailed description of the present invention when taken in conjunction with the accompanying drawings.

BEST MODE FOR EMBODYING THE INVENTION

Figure 1:
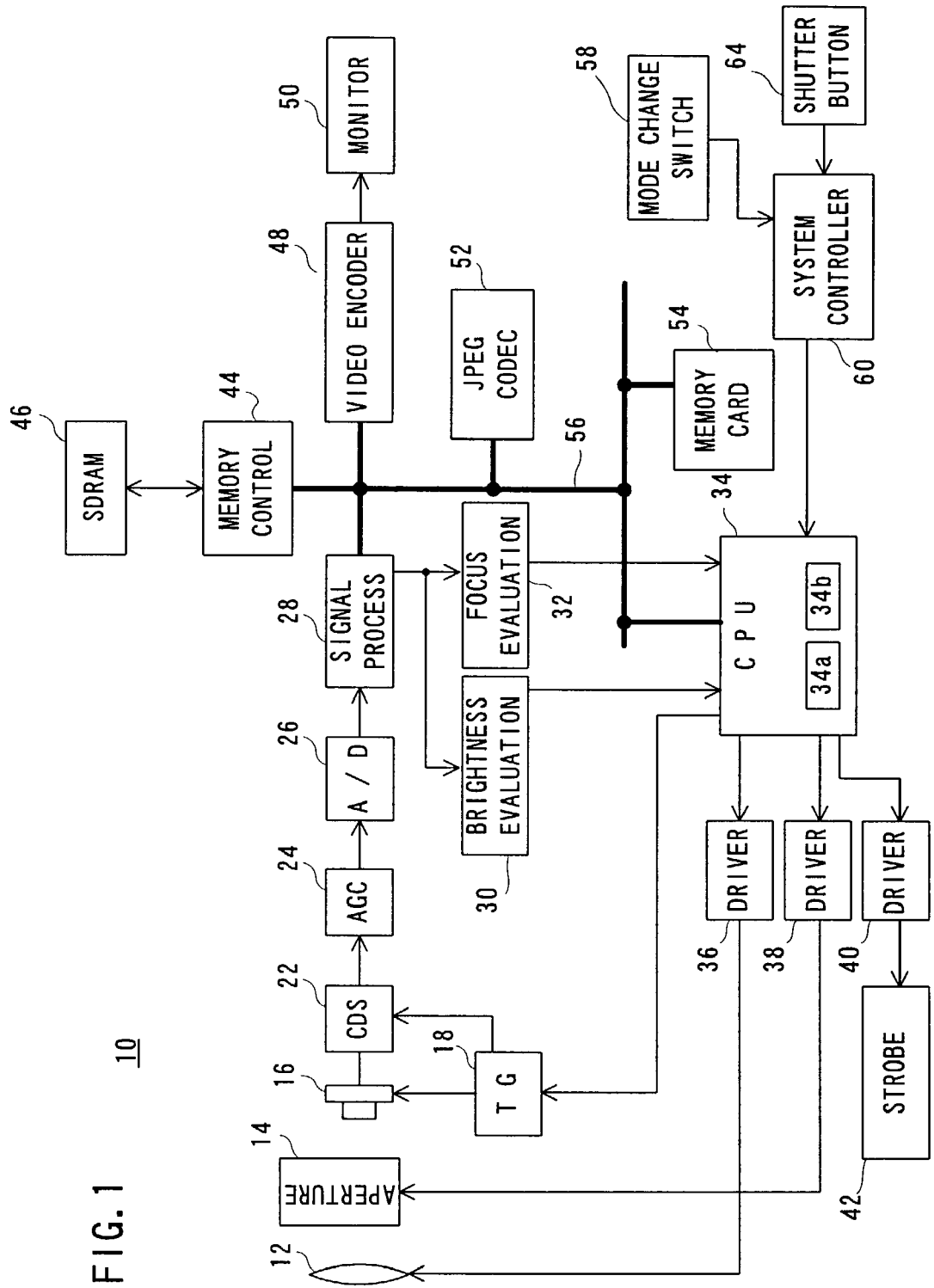
FIG. 1 is a block diagram showing one embodiment of the present invention.

Referring to FIG. 1, a digital camera 10 of this embodiment includes a focus lens 12 and an aperture unit 14. An object image (optical image of the object) is irradiated into a CCD imager 16 of an interline transfer scheme through these members. It is noted that an effective area of the CCD imager 16 has a resolution of 640 pixels×480 lines (VGA) and a total number of pixels including an optical black area is 680 pixels×533 lines. Furthermore, a light-receiving surface of the CCD imager 16 is covered with a color filter (not shown) of a primary color Bayer array, for example.

Figure 2:
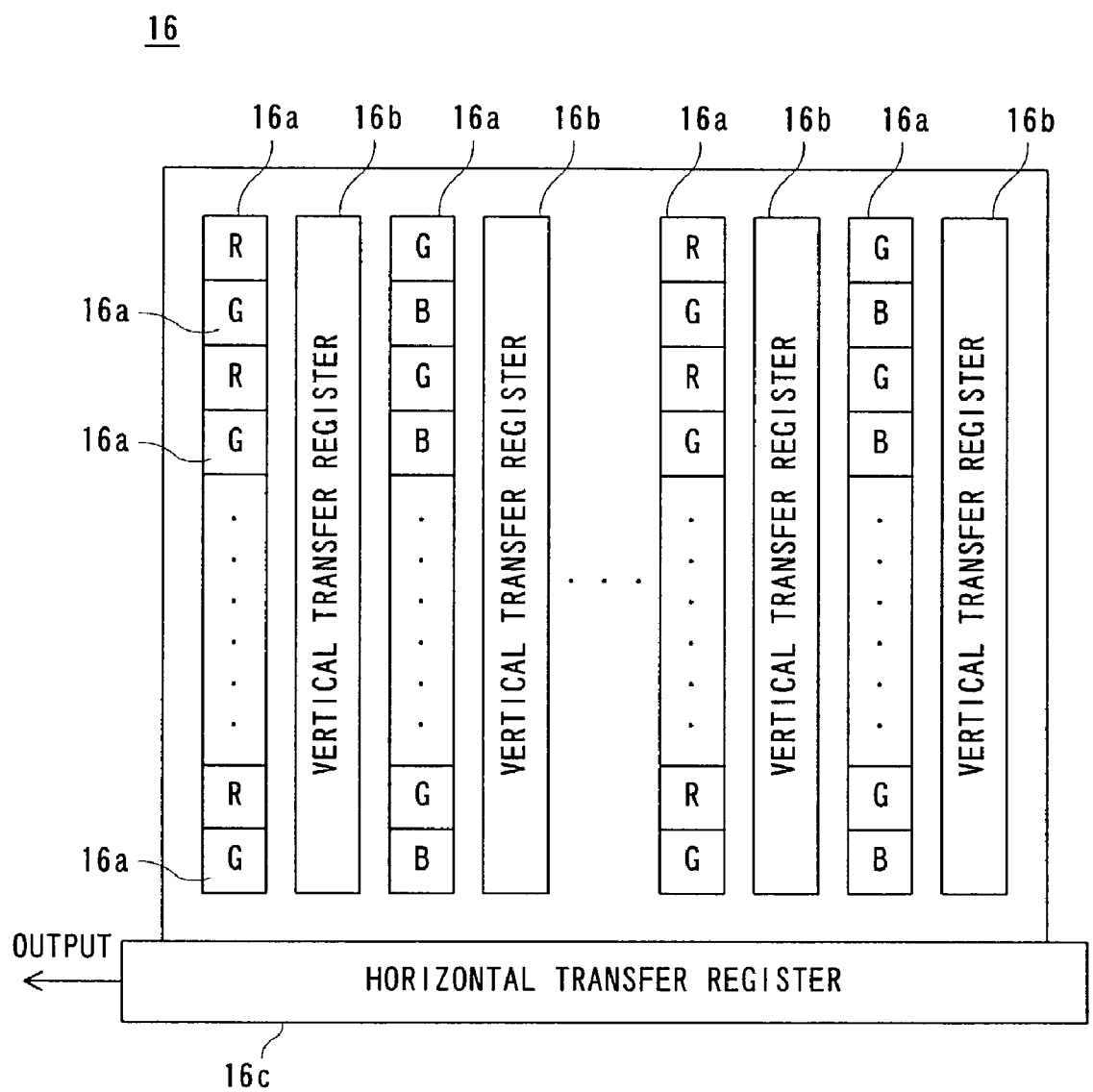
FIG. 2 is an illustrative view showing a configuration of a CCD imager.

As shown in FIG. 2, the CCD imager 16 includes a plurality of light-receiving elements 16a corresponding to each of pixels, a plurality of vertical transfer registers 16b for transferring in a vertical direction an electric charge generated by photoelectronic conversion and accumulated in each light-receiving element 16a, and a horizontal register 16c arranged at an end of the vertical transfer register 16b for transferring in a horizontal direction the electric charge transferred by the vertical transfer register 16b. These elements are driven by timing pulses output from a timing generator 18 (TG). As the timing pulses, vertical transfer pulses for reading the electric charge from the light-receiving element 16a to the vertical transfer register 16b and transferring the read electric charge in a vertical direction line by line, a horizontal transfer pulse for transferring the electric charge within the horizontal transfer register 16c pixel by pixel in a horizontal direction, and a charge sweep pulse for sweeping the electric charge generated in the light-receiving portion 16a during non-exposure time period, i.e., an electric charge accumulating period to an overflow drain (not shown) are utilized.

Figure 3:
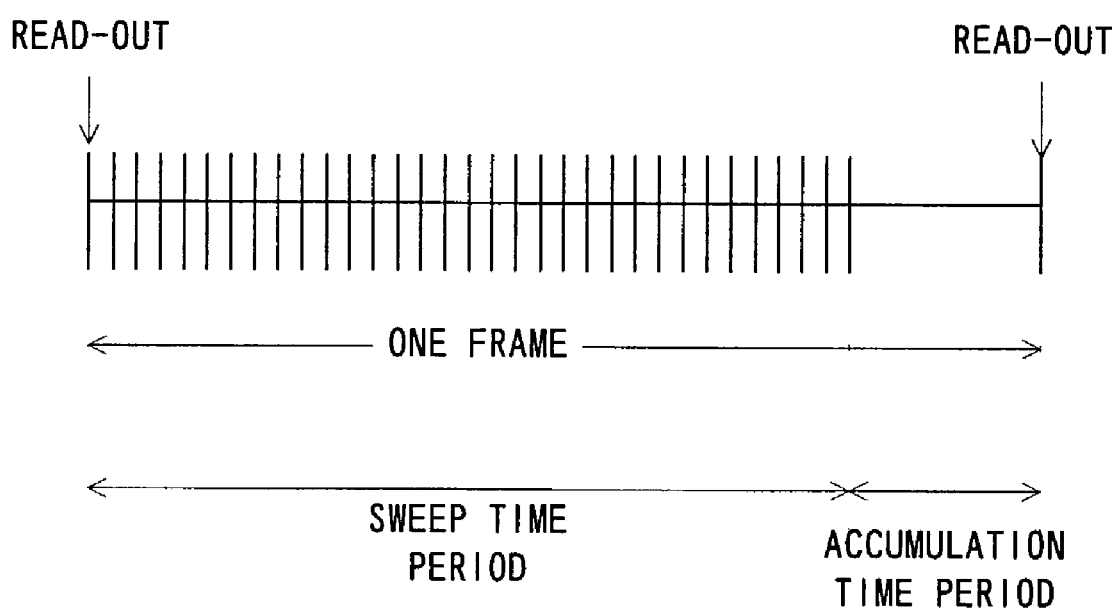
FIG. 3 is an illustrative view showing one example of an operation in an electric shutter scheme.

As shown in FIG. 3, a sweeping time period starts from a start of a noted one field time period, and an end of the sweeping time period is controlled. The electric charge accumulating period is changed depending thereto, whereby a desired shutter speed (exposure time) is obtained. Such the art for controlling the exposure time by the sweeping pulse is known as an electronic shutter function.

When a mode setting switch 58 is switched to a "camera" side, a system controller 60 applies a corresponding key state signal to a CPU 34. Thereupon, the CPU 34 activates a signal processing block including the TG 18, a signal processing circuit 28 and etc., and an encode block including a video encoder 48, a monitor (display) 50 and etc.

The TG 18 generates the above-described timing pulses so as to read a camera signal (raw image signal) from the CCD imager 16. The read camera signal is subject to correlative double sampling and gain control in a CDS circuit 22 and an AGC circuit 24, respectively. The camera signal subjected to the gain control is applied to the signal processing circuit 28 through an A/D converter 26. The signal processing circuit 28 generates a YUV signal on the basis of the applied camera signal, and then outputs the generated YUV signal to a memory control circuit 44 together with a writing request. The YUV signal is written to an SDRAM 46 by the memory control circuit 44.

The YUV signal written in the SDRAM 46 is then read by the same memory control circuit 44 on the basis of a reading-out request output from the video encoder 48. The video encoder 48 converts the read YUV signal into a composite image signal in an NTSC format so as to apply the converted composite image signal to the monitor 50. Consequently, a motion image (through image) of the object is displayed on a monitor screen in a real time.

The Y signal out of the YUV signal generated in the signal processing circuit 28 is also input to a luminance evaluation circuit 30 and a focus evaluation circuit 32. The Y signal is integrated every frame in the luminance evaluation circuit 30, and whereby, one screen of integrated value is acquired. The integrated value is a luminance evaluation value. On the other hand, a high-frequency component of the Y signal is integrated every frame in the focus evaluation circuit 32. The integrated value thus obtained is an AF evaluation value. The luminance evaluation value is utilized for calculation of an optimal shutter speed (optimal exposure time period) and an emission amount of a strobe 42 while the AF evaluation value is utilized for a focus control.

When an operator half-presses a shutter button 64, the system controller 60 outputs to the CPU 34 a key state signal indicative of a half-pressed state. Herein, the CPU 34 first pre-exposes the CCD imager 16 and fetches the luminance evaluation value based on the camera signal thus obtained thereby. Then, the optimal exposure time period is acquired on the basis of the fetched luminance evaluation value. Succeedingly, the CPU 34 performs focus adjustment. First, the CPU 34 serially sets the focus lens 12 at a plurality of positions by driving the driver 36 so as to perform pre-exposure at each position for a predetermined time period. Furthermore, the CPU 34 fetches from the luminance evaluation circuit 30 the AF evaluation value of the object image pictured by each pre-exposure and specifies a maximum AF evaluation value from among a plurality of AF evaluation values fetched. Then, the CPU 34 places the focus lens 12 at a position corresponding to the specified maximum AF evaluation value.

When the shutter button 64 is full-pressed after a photographing condition is thus adjusted, the CPU 34 determines whether or not the above-described optimal exposure time period is within a settable range. If it is within the settable range, main exposure according to the optimal exposure time period is implemented without emitting the strobe 42. On the other hand, if the optimal exposure time period is out of the settable range, the CPU 34 emits the strobe 42 by driving the driver 40 for the purpose of complementing shortage of exposure and performs main-exposure according to a predetermined exposure time period.

The camera signal generated by the main exposure is converted to the YUV signal in the same manner as above description, and then the YUV signal is written to the SDRAM 46. The YUV signal written to the SDRAM 46 is read on the basis of the reading-out request from a JPEG codec 52 so as to be subjected to a compression process by the JPEG codec 52. The compressed YUV signal thus obtained is temporarily stored in the SDRAM 46 by the memory control circuit 44, and then, read in response to a request from the CPU 34. The read compressed YUV signal is recorded onto a memory card 54 by the CPU 34.

Figure 4:
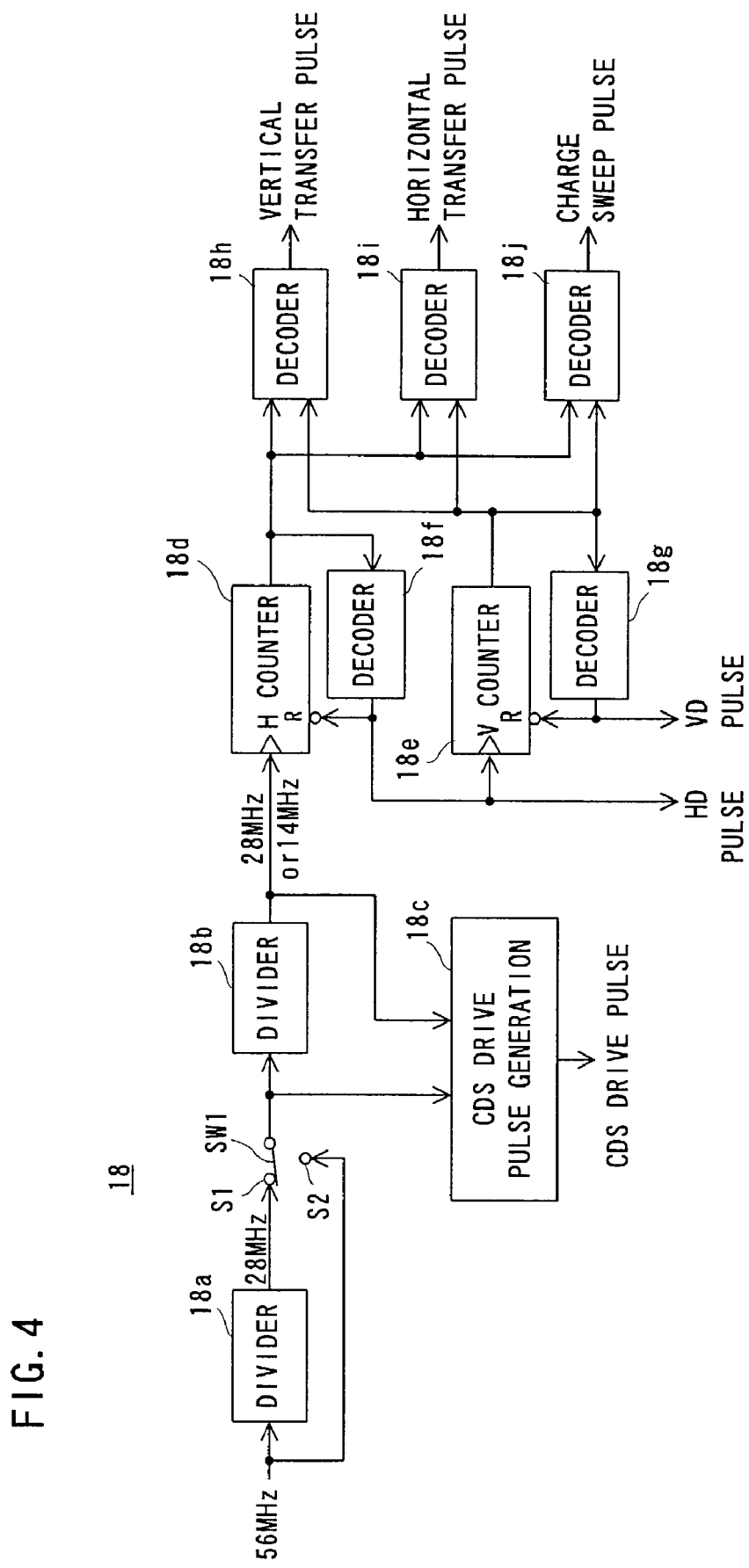
FIG. 4 is a flowchart showing a configuration of a timing generator.
Figure 5:
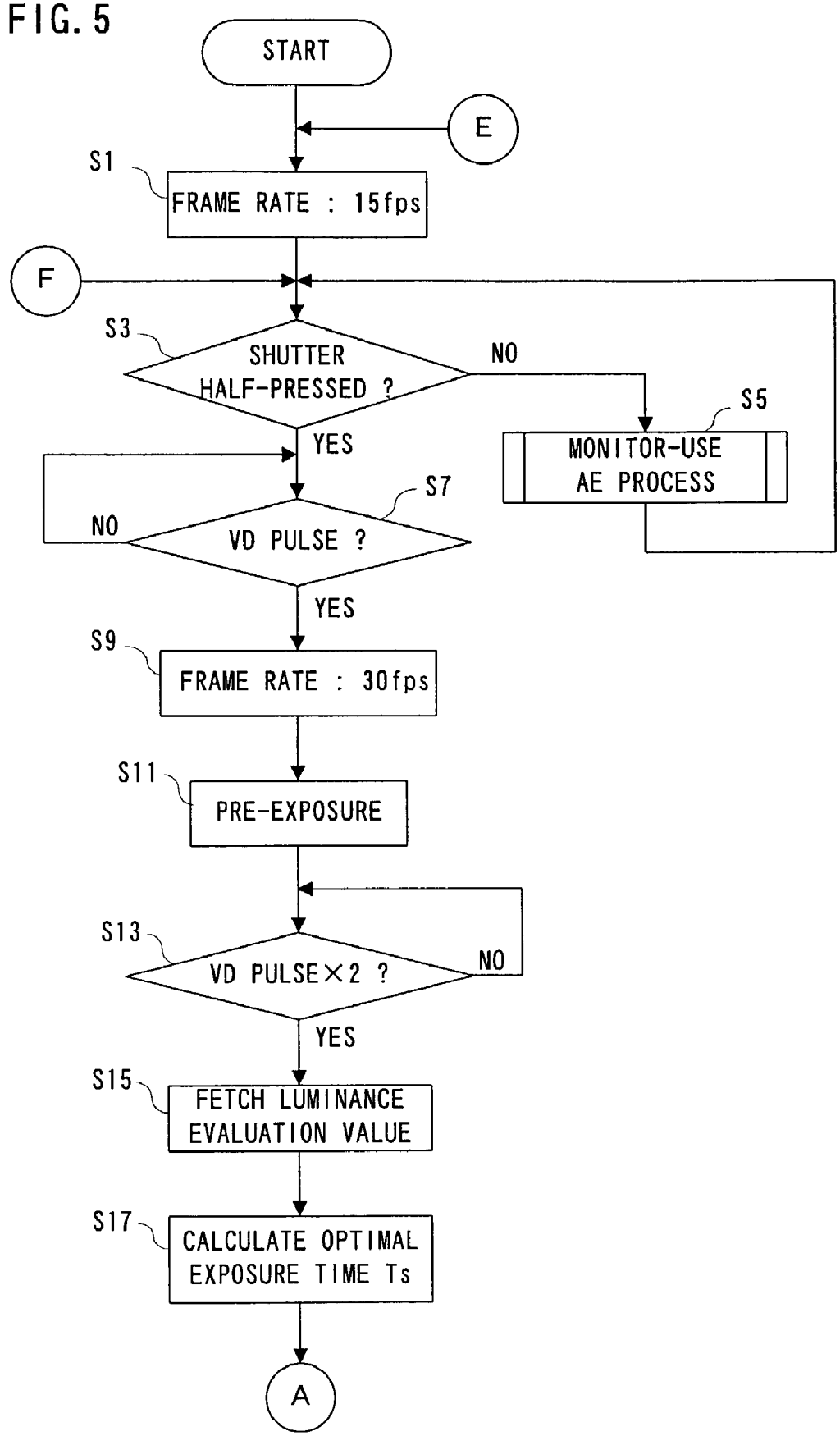
FIG. 5 is a flowchart showing a part of an operation of FIG. 1 embodiment.
Figure 6:
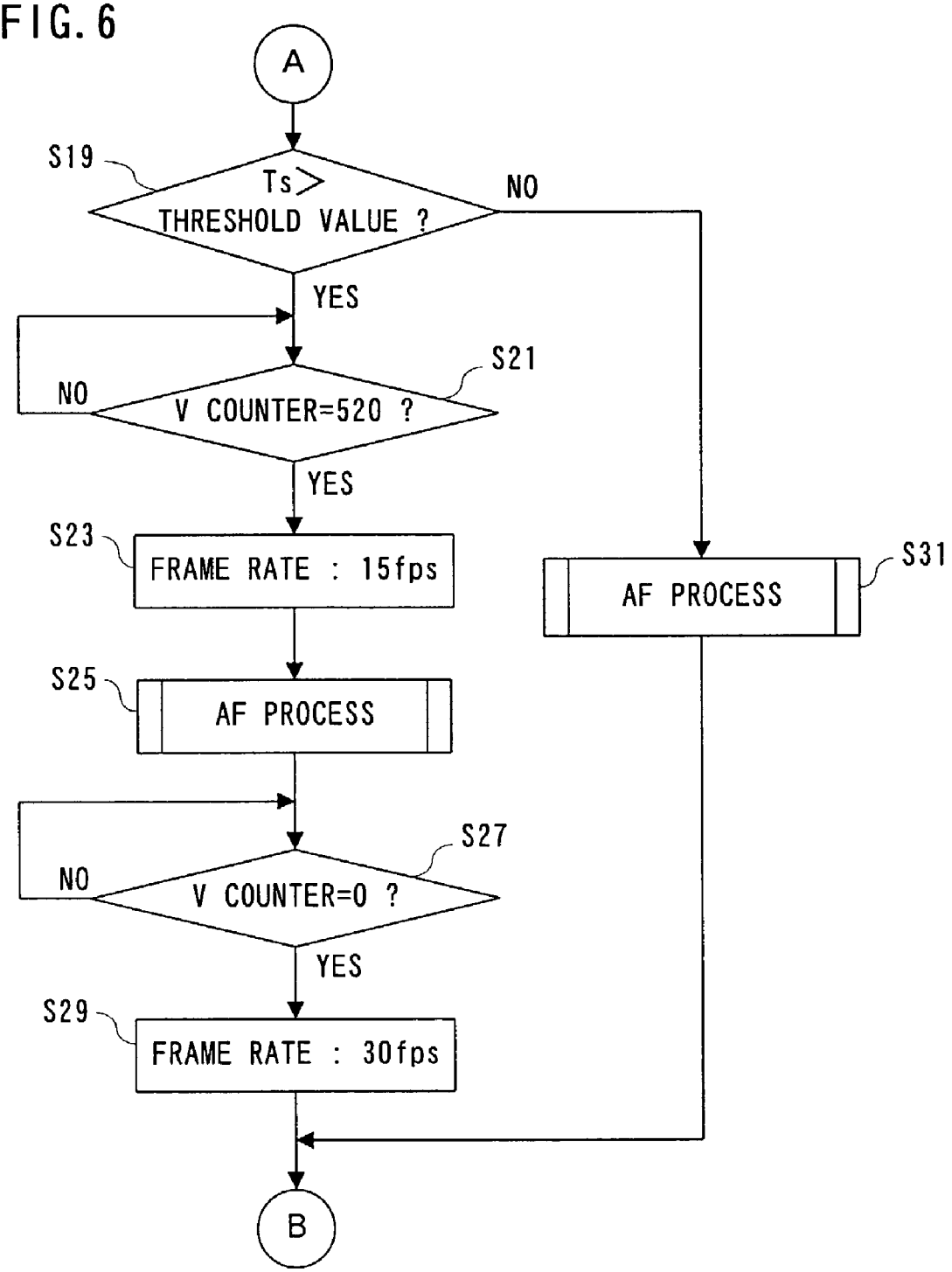
FIG. 6 is a flowchart showing another part of the operation of FIG. 1 embodiment.
Figure 7:
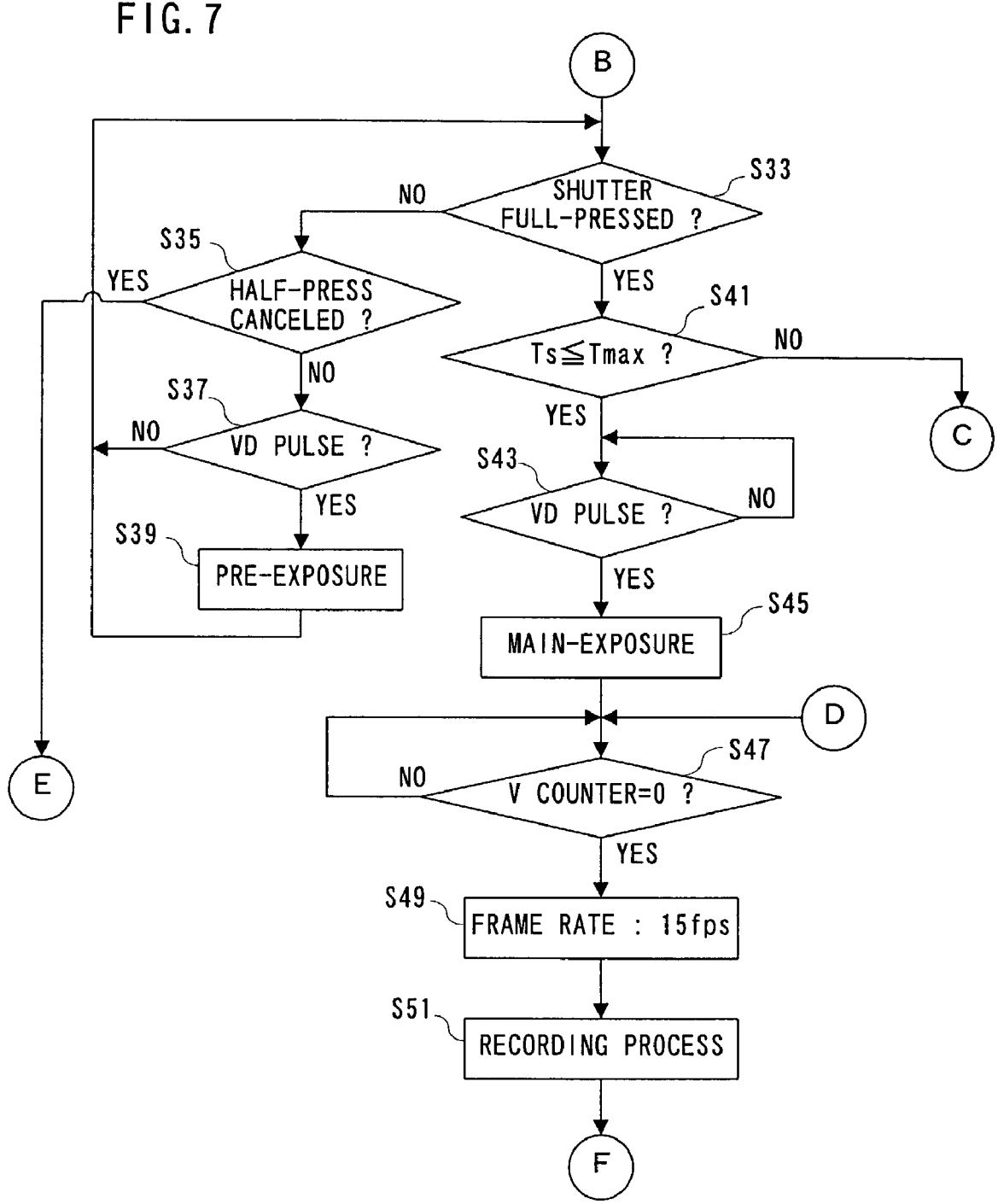
FIG. 7 is a flowchart showing the other part of the operation of FIG. 1 embodiment.
Figure 8:
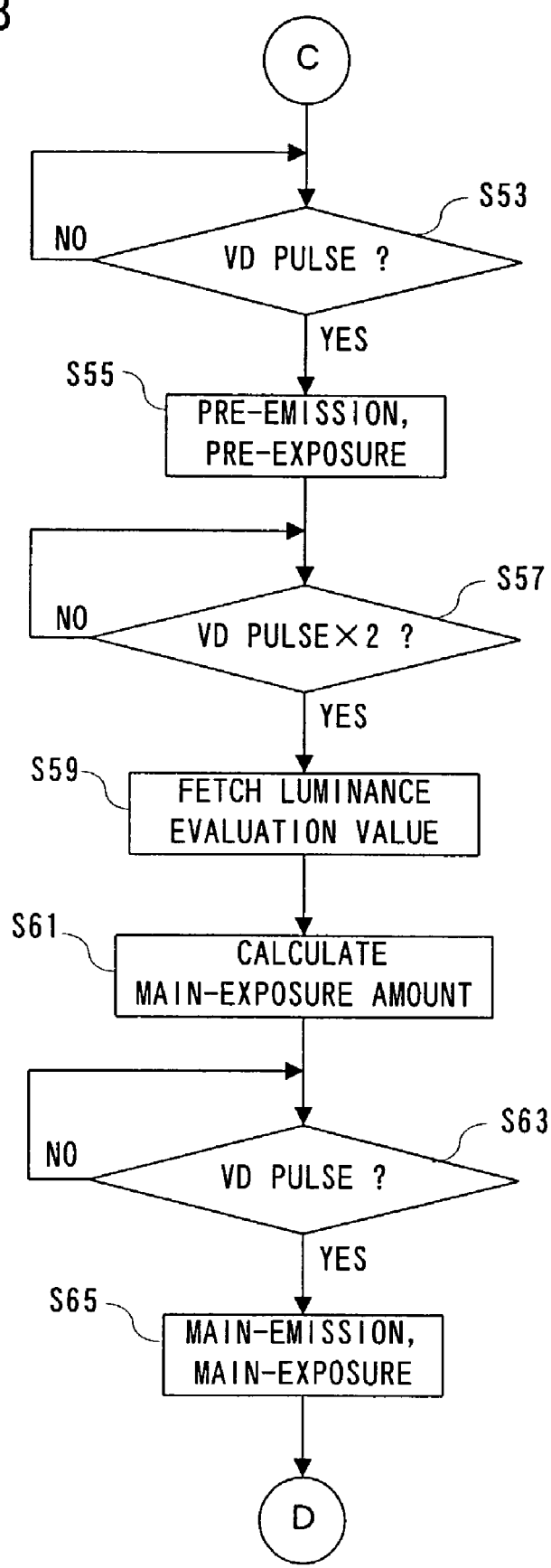
FIG. 8 is a flowchart showing further part of the operation of FIG. 1 embodiment.

The TG 18 is specifically constituted as shown in FIG. 4. A divider 18*a* divides a system clock of 56 MHz output from an oscillator not shown into halves so as to generate a divided clock of 28 MHz. A switch SW1 selects whether the system clock of 56 MHz or the divided clock of 28 MHz in response to a control signal from the CPU 34 and applies a selected clock to a divider 18*b*. Herein, when the CCD imager 16 is driven at a frame rate of 15 fps, the divided clock of 28 MHz is selected by the switch SW1, and when the CCD imager 16 is driven at a frame rate of 30 fps, the system clock of 56 MHz is selected by the switch SW1.

The divider 18*b* also divides the applied clock into halves. Accordingly, when the system clock of 56 MHz is selected by the switch SW1, a divided clock of 28 MHz is output from the divider 18*b*, and when the divided clock of 28 MHz is selected by the switch SW1, a divided clock of 14 MHz is output from the divider 18*b*. The divided clock output from the divider 18*b* is applied to a clock terminal of an H counter 18*d*.

The H counter 18*d* is incremented in response to the input divided clock, and a counted value (horizontal counted value) is applied to a decoder 18*f*. When the horizontal counted value indicates "680", the decoder 18*f* generates an active signal (HD pulse) so as to apply the HD pulse to a reset terminal of the H counter 18*e*. Accordingly, the horizontal counted value is circularly changed between "0" and "679".

The HD pulse is also applied to a clock terminal of a V counter 18*e*, and the V counter 18*e* is incremented in response to the HD pulse. A counted value (vertical counted value) of the V counter 18*e* is applied to a decoder 18*g*, and the decoder 18*g* generates an active signal (VD pulse) when the vertical counted value indicates "533". The VD pulse is input to a reset terminal of a V counter 18*c*, and whereby, the vertical counted value is circularly changed between "0" and "532". When the system clock of 56 MHz is selected by the switch SW1, the VD pulse is output every 1/30 seconds, and when the divided clock of 28 MHz is selected by the switch SW1, the VD pulse is output every 1/15 seconds.

The horizontal counted value and the vertical counted value are also applied to decoders 18*h* to 18*j*. The decoders 18*h* to 18*j* respectively generate the above-described vertical transfer pulse, the horizontal transfer pulse, and the charge sweep pulse on the basis of these counted value and a control signal from the CPU 34. When the system clock of 56 MHz is selected by the switch SW1, these pulses are generated at a period corresponding to 30 fps, and when the divided clock of 28 MHz is selected by the switch SW1, these pulses are generated at a period corresponding to 15 fps.

It is noted that the HD pulse, the VD pulse, the horizontal counted value and the vertical counted value are also output to the CPU 34 for the purpose of a photographing process described later.

The clock (58 MHz or 28 MHz) output from the switch SW1 and the clock (28 MHz or 14 MHz) output from the divider 18*b* are also applied to a CDS drive pulse generation circuit 18*c*. The CDS drive pulse generation circuit 18*c* generates a CDS drive pulse corresponding to 30 fps or 15 fps on the basis of the applied two clocks. That is, when the system clock of 56 MHz is output from the switch SW1 and the divided clock of 28 MHz is output from the divider 18*b*, the CDS drive pulse corresponding to 30 fps is generated, and when the divided clock of 28 MHz is output from the switch SW1 and the divided clock of 14 MHz is output from the divider 18*b*, the CDS drive pulse corresponding to 15 fps is generated. Thus, the TG 18 outputs a pulse for driving the CDS circuit 22 in addition to timing pulses for driving the CCD imager 16.

The CPU 34 processes a flowchart shown in FIG. 5 to FIG. 11 when a camera mode is selected. First, the switch SW1 is connected to a terminal S1 so as to set the frame rate of the CCD imager 16 to 15 fps in a step S1. Then, it is determined whether or not the shutter button 64 is half-pressed, and if "NO" is determined, a monitor-use AE process is performed in a step S5. The monitor-use AE process is repeatedly executed as long as the shutter button 64 is not operated and whereby, a through image of the object photographed with a proper exposure amount is displayed on the monitor 50.

When the shutter button 64 is half-pressed, "YES" is determined in a step S3, and it is determined whether or not the VD pulse is input in a step S7. Then, at a time of obtaining a determination result of input, the process proceeds to a step S9. The switch SW1 shown in FIG. 4 is connected to a terminal S2 so as to set a frame rate of the CCD imager 16 to 30 fps in the step S9. Succeedingly, the pre-exposure is implemented in a step S11, and it is determined whether or not the VD pulse is input in a step S13. In the step S11, the pre-exposure is implemented according to an exposure time period determined by the monitor-use AE process in the step S5, and "YES" is determined in the step S13 when the VD pulse is output twice.

At a time "YES" is determined in the step S13, a luminance evaluation value based on the pre-exposure implemented before 2 frames, i.e., in the step S11 is output from the luminance evaluation circuit 30. The luminance evaluation value is fetched in a step S15, and an optimal exposure time period Ts is calculated on the basis of the fetched luminance evaluation value in a following step S17. The calculated exposure time period Ts is compared with a predetermined threshold value (i.e., 1/8 seconds) in a step S19. Herein, if a condition of Ts≦the threshold value is satisfied, the AF process is executed in a step S31, and then, the process proceeds to a step S33, whereas if a condition of TS>the threshold value is satisfied, a series of processes from steps S21 to S29 is executed, and the process proceeds to the step S33.

First, it is determined whether or not the vertical counted value of the V counter 18*c* becomes "520" in the step S21, and when a determination result of "YES" is obtained, the frame rate is changed to 15 fps in the step S23. The frame rate is switched approximately at the same time as the generation of the VD pulse (i.e., within optical black period), and no switching noise appears on the monitor 50. The AF process is executed in the step S25, and after completion of the AF process, it is determined whether or not the vertical counted value becomes "0" in the step S27. Then, at the same time that "YES" is determined, the frame rate is returned to 30 fps in the step S29. The switching is also implemented approximately at the same time as the generation of the VD pulse.

It is determined whether or not the shutter button 64 is in the full-pressed state in the step S33, and it is determined whether or not the half-pressed state of the shutter button 64 was canceled in a step S35. If the half-pressed state is continued, it is determined whether or not the VD pulse is input in a step S37, and the pre-exposure according to the optimal exposure time period Ts is implemented in response to a determination result of input in a step S39. On the other hand, if the half-pressed state is canceled, the process returns from the step S35 to the step S1. That is, if the half-pressed state is continued, the pre-exposure is repeated in a state that a position of the focus lens 12 is fixed, and a through image based on the pre-exposure is displayed on the monitor 50.

When the shutter button 64 shifts from the half-pressed state to the full-pressed state, "YES" is determined in the step S33, and the optimal exposure time period Ts is compared with a longest exposure time period Tmax in a step S41. Since a frame rate of the image sensor 16 is 30 fps at this time, the longest exposure time period Tmax is 1/30 seconds.

When Ts≦Tmax is determined, it is determined whether or not the VD pulse is input in a step S43 and then, the process proceeds to a step S45 so as to implement the main-exposure according to the optimal exposure time period Ts. After completion of the main-exposure, the vertical counted value is determined in a step S47, and when the vertical counted value indicates "0", the frame rate is returned to 15 fps in a step S49. A recording process of a camera signal obtained by the main-exposure (image signal of desired object) is implemented in a step S51. That is, the camera signal based on the main-exposure is converted to a YUV signal, the converted YUV signal is subject to JPEG compression, and then, the compressed YUV signal thus obtained is recorded onto the memory card 54. After completion of the recording process, the process returns to the step S3.

On the other hand, when Ts>Tmax is determined in the step S41, pre-emission and pre-exposure are performed in a step S55 after inputting of the VD pulse is determined in a step S53. That is, the strobe 42 is emitted with a predetermined pre-emission amount, and the pre-exposure according to the longest exposure time period Tmax is performed on the image sensor 16. In a following step S57, it is determined whether or not the VD pulse is input twice, and if "YES" is determined, the luminance evaluation value is fetched from the luminance evaluation circuit 30 in a step S59. The fetched luminance evaluation value is an evaluation value based on the pre-emission and the pre-exposure in the step S55, and the main-exposure amount is calculated on the basis of the luminance evaluation value in a step S61. Thereafter, it is determined whether or not the VD pulse is input in a step S63, and then, the process proceeds to a step S65 so as to emit the strobe 42 with the calculated main-exposure amount and perform the main-exposure on the image sensor 16 according to the longest exposure time period Tmax. After completion of the main-emission and the main-exposure, the processes S47 to S51 are executed and then return to the step S3.

Figure 9:
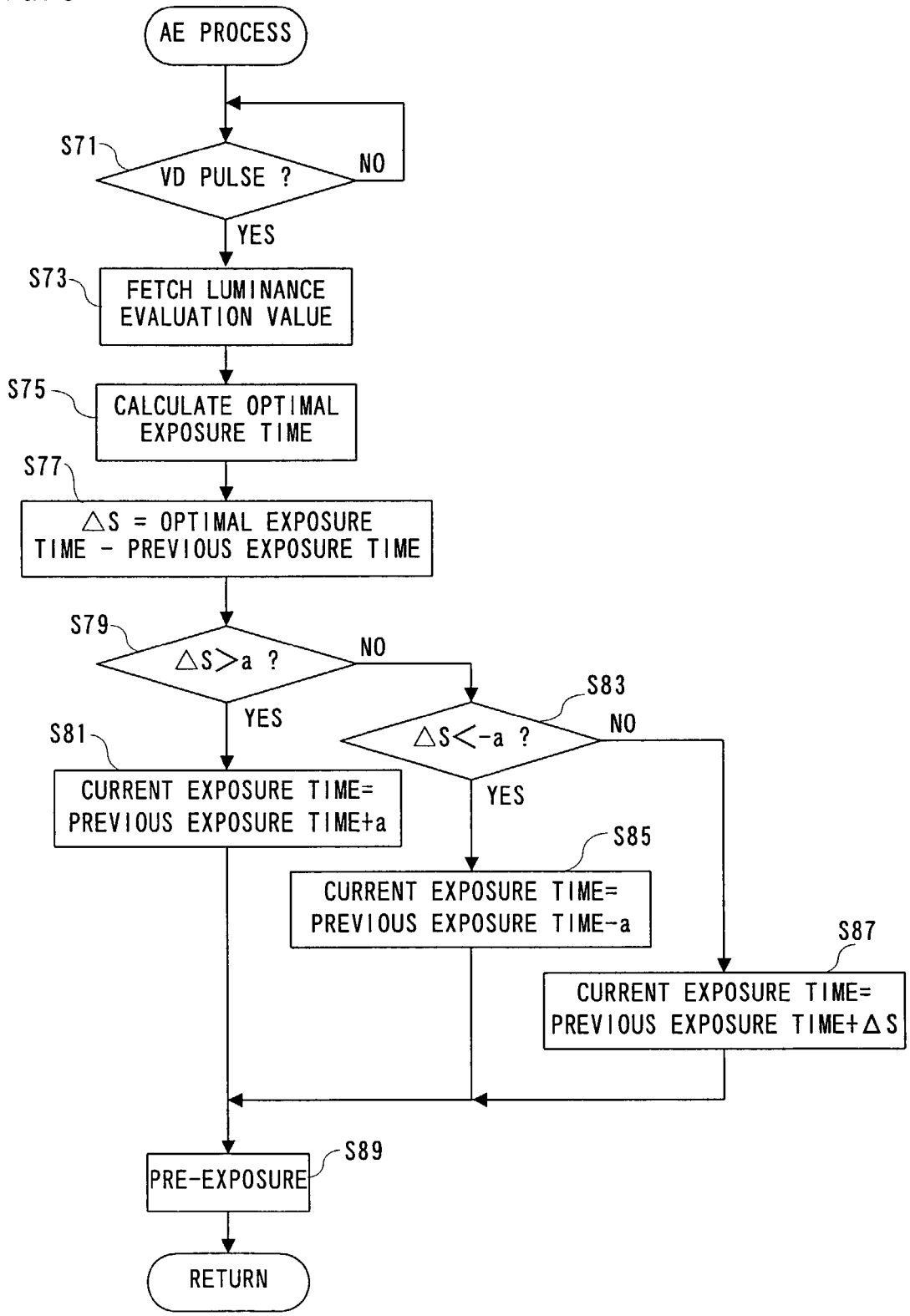
FIG. 9 is a flowchart showing another part of the operation of FIG. 1 embodiment.

A subroutine shown in FIG. 9 is processed in the step S5. First, it is determined whether or not the VD pulse is input in a step S71, and if a determination result of "YES" is obtained, the luminance evaluation value is fetched in a step S73. The optimal exposure time period is calculated on the basis of the fetched luminance evaluation value in a step S75. In a following step S77, a difference ΔS is obtained by subtracting the exposure time period of the previous time (previous exposure time period) from the calculated exposure time period, and then, the difference ΔS is compared with predetermined values "a" and "−a" in steps S79 and S83, respectively. If a condition of ΔS>a is satisfied, the predetermined value "a" is added to the previous exposure time period in a step S81 so as to take the added value as a current exposure time period. If a condition of ΔS<−a is satisfied, a predetermined value "a" is subtracted from the previous exposure time period in a step S85 so as to take the subtracted value as the current exposure time period. On the other hand, if "NO" is determined in the both steps S79 and S83, the difference ΔS is added to the previous exposure time period in a step S87 so as to take the added value as the current exposure time period. The pre-exposure is executed according to the determined current exposure time period in a step S89, and after completion of the pre-exposure, the process is returned to FIG. 5. Thus, the exposure time is never changed lager than a width of a predetermined value "a", and the brightness of the through image displayed on the monitor 50 is smoothly changed.

It is noted that since it takes two frames of period from executing the pre-exposure to obtaining the luminance evaluation value based thereon, the pre-exposure during first two frames of period is executed according to an initial value.

Figure 10:
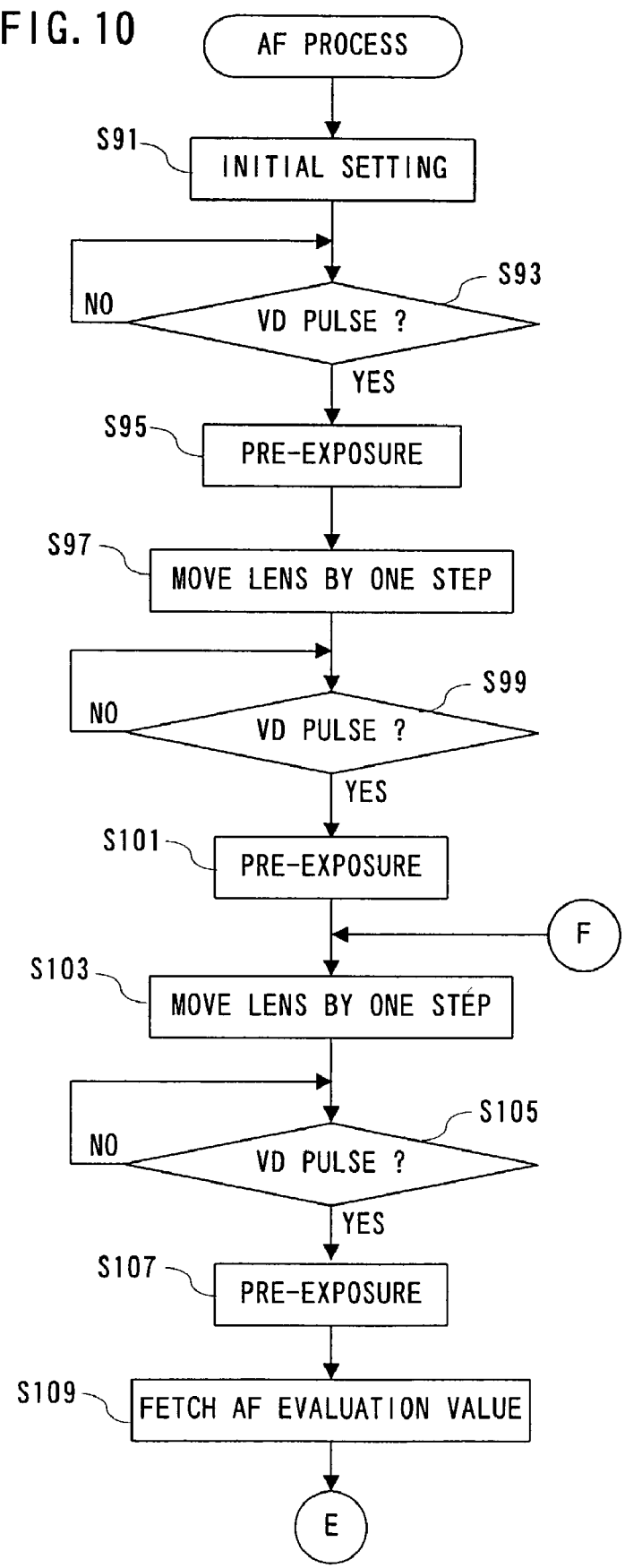
FIG. 10 is a flowchart showing the other part of the operation of FIG. 1 embodiment.
Figure 11:
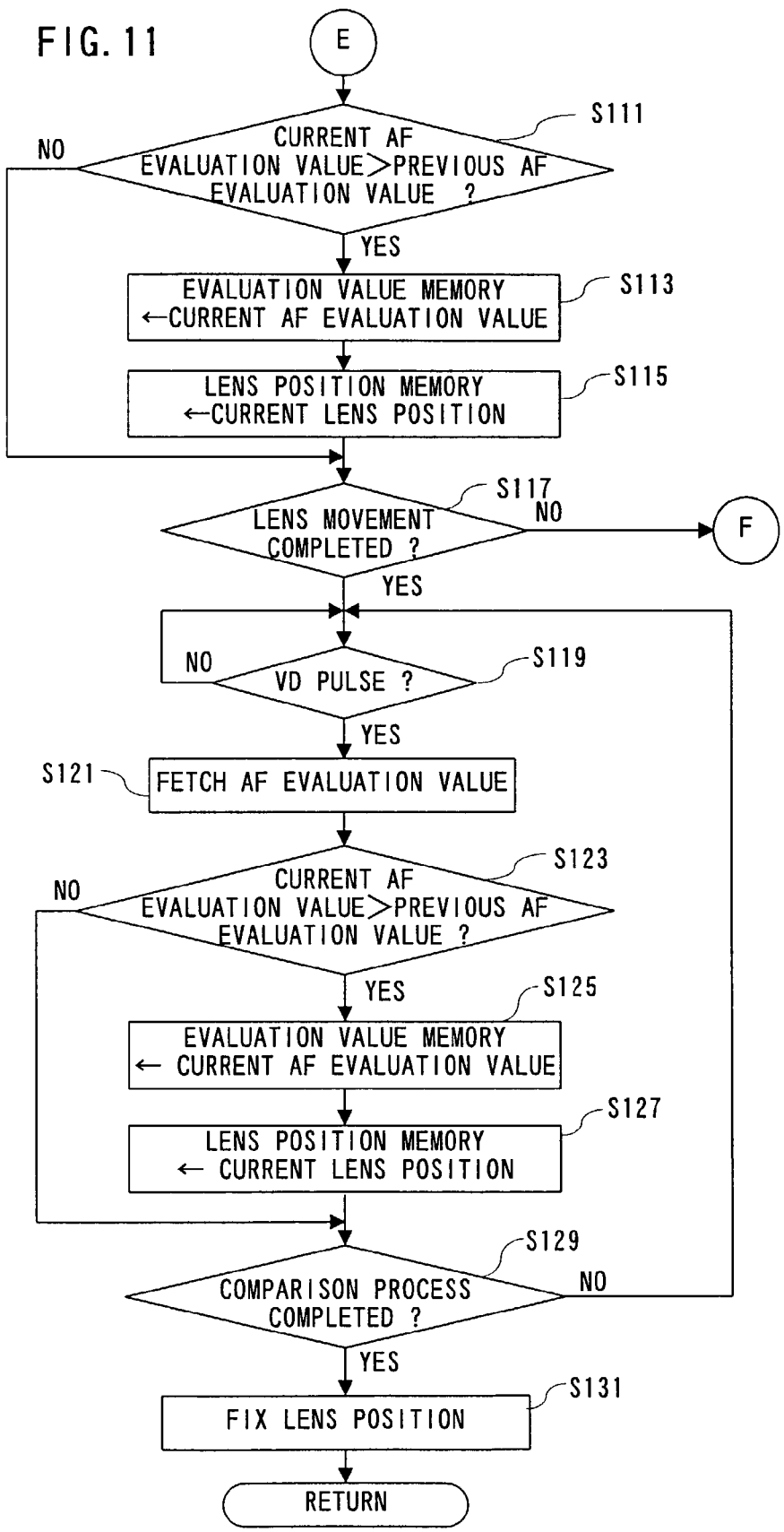
FIG. 11 is a flowchart showing further part of the operation of FIG. 1 embodiment.

The AF process is executed according to a subroutine shown in FIG. 10 and FIG. 11 in the step S25 or S31. First, an initial setting is executed in a step S91. Specifically, the focus lens 12 is placed at an initial position by driving the driver 38, and an AF evaluation value memory 34a and a lens position memory 34b are cleared.

Succeedingly, a series of processes of determination of input of the VD pulse, pre-exposure and one step movement of the focus lens 12 is executed in steps S93 to S97 and steps S99 to S103. The determination of input of the VD pulse and the pre-exposure are executed again in steps S105 and S107, respectively and then, the AF evaluation value is fetched from the focus evaluation circuit 32 in a step S109. The AF evaluation value fetched in this step is an evaluation value based on the pre-exposure in the step S95.

The AF evaluation value currently acquired (current AF evaluation value) is compared with the AF evaluation value (previous AF evaluation value) stored in the evaluation value memory 34a. In a first step S111, a condition of the current AF evaluation value>previous AF evaluation value (=0) is satisfied, and at this time, the current AF evaluation value is stored in the AF evaluation value memory 34a in a step S113 and current lens position data is stored in the lens position memory 34b in a step S115, and then, the process proceeds to a step S117. It is noted that a condition of the current AF evaluation value≦the previous AF evaluation value is satisfied, "NO" is determined in the step S111 and then, the process directly proceeds to the step S117.

It is determined whether or not movement of the focus lens 12 is completed in the step S117. More specifically, it is determined whether or not a movement process of the focus lens 12 is executed a predetermined times, and if it is not reached to a predetermined times, the process of steps S103 to step S117 is repeated. Thus, a maximum AF evaluation value out of the AF evaluation values fetched by the time the movement of the focus lens 12 is completed is stored in the AF evaluation value memory 34a, and the position data of the focus lens 12 at a time the maximum AF evaluation value is fetched is stored in the lens position memory 34b.

It is noted that it takes 2 frames of period from the execution of the pre-exposure to the calculation of the AF evaluation value based thereon, and after completion of the movement of the focus lens 12, the AF evaluation value can be acquired twice. Thus, the same process as the steps S105 and S111 to S115 is executed in steps S119 to S127. Furthermore, it is determined whether or not a comparison process for the two AF evaluation values is completed in a step S129. If "YES" is determined in the step S129, a position of the focus lens 12 is fixed in a step S131. There is a deviation of two steps between the lens position indicated by the lens position data stored in the lens position memory 34b and the lens position in which the maximum AF evaluation value can be obtained, so that the focus lens 12 is located at a position before two steps than that indicated by the lens position data. After completion of such the focus adjustment, the process is restored to FIG. 5.

In the AF process of the step S25, the pre-exposure is executed according to the optimal exposure time period Ts, and in the AF process of the step S31, the pre-exposure is executed for ⅟15 seconds. That is, since it is when the optimal exposure time period Ts is longer than the threshold value (=⅛ seconds) that the process in the step S31 is executed, the pre-exposure is executed with a longest exposure time period settable so as to reserve a maximum exposure amount.

Figure 12:
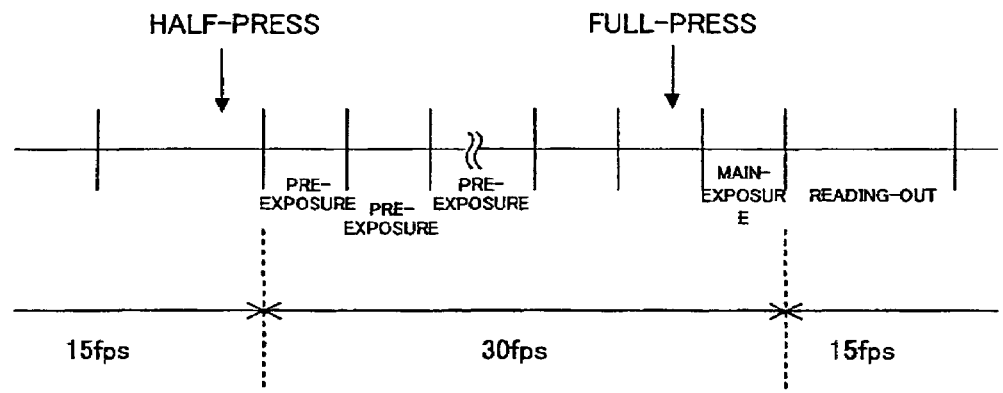
FIG. 12 is an illustrative view showing one part of the operation of FIG. 1 embodiment.

Referring to FIG. 12, when the shutter button 64 is half-pressed, the CCD imager 16 is subject to a pre-exposure at a frame rate of 30 fps (every ⅟30 seconds). The camera signal generated by the pre-exposure is read from the CCD imager 16 at a speed corresponding to 30 fps. That is, the vertical transfer pulse and the horizontal transfer pulse are generated on the basis of the system clock of 28 MHz in which 30 fps can be obtained, so that the camera signal is read at a speed corresponding to 30 fps. The read camera signal is subject to signal processes for displaying a through image on the monitor 50 and adjusting the focus.

When the shutter button 64 is shifted from the half-pressed state to the full-pressed state, the main-exposure is executed at a next frame. Then, when the main-exposure is completed, the frame rate is changed from 30 fps to 15 fps. The camera signal of the desired object generated by the main-exposure is read at a speed corresponding to 15 fps. Specifically, the vertical transfer pulse and the horizontal transfer pulse are generated on the basis of the divided clock of 14 MHz in which 15 fps is obtained, so that the camera signal is read at a speed corresponding to 15 fps.

Figure 13A:
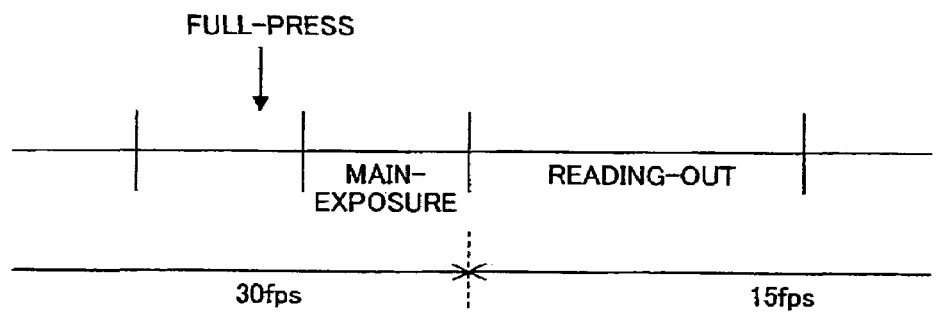
FIG. 13(A) is an illustrative view showing a part of the operation of FIG. 1 embodiment, and (B) is an illustrative view showing a part of an operation of a prior art.
Figure 13B:
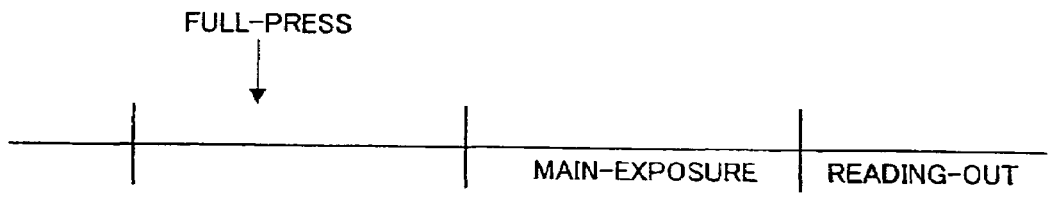

Thus, a frame rate at the pre-exposure (30 fps) is faster than a frame rate at a time of reading the camera signal generated by main-exposure (15 fps). Accordingly, as can be understood from FIG. 13(A) and FIG. 13(B), a time lag from a full-press of the shutter button 64 to a start of the next frame (frame to execute the main-exposure) is made shorter than a case that a frame rate constantly retains 15 fps. Consequently, a response characteristic is improved. Furthermore, reading the camera signal generated by the main-exposure at a speed corresponding to 15 fps reduces noise included in the camera signal.

If the brightness of the object is not enough, a frame rate of the CCD imager 16 at a time of executing focus adjustment is changed from 30 fps to 15 fps. Thus, a reading speed of the camera signal is reduced, and whereby, noise included in the camera signal is also reduced. Since the AF evaluation value is obtained by integrating a high-frequency component of the Y signal generated on the basis of the camera signal, high noise causes an error of the AF evaluation value and fails to precisely adjust the focus. Since a driving speed of the CCD imager 16, when the brightness of the object is not enough, is reduced in this embodiment, it is possible to prevent the AF evaluation value from being influenced by noise and therefore, it is possible to precisely adjust the focus.

Although a photographing process in an aperture priority mode is described in this embodiment, the present invention is applicable to a photographing process in a program AE mode or an exposure time priority mode. It is noted that there is a need to execute brightness determination in the step S19 of FIG. 6 on the basis of an EV value in the program AE mode, and there is a need to execute the brightness determination in the same step S19 on the basis of an amount of aperture in the exposure time priority mode.

Although a photographing condition such as a focus and etc. is adjusted when the shutter button is half-pressed and a main-exposure is executed when the shutter button is full-pressed in this embodiment, the adjustment of the photographing condition and the main-exposure may be successively executed in response to a press of the shutter button without providing a half-press operation. In this case, the press of the shutter button is equal to a photographing instruction.

Furthermore, although the camera signal generated by the main-exposure is read at a speed corresponding to 15 fps in this embodiment, the camera signal may be read at a lower speed. It is noted that the camera signal at a time of the main-exposure may preferably be read at a speed of one-Nth (N: integer number more than 2) at a time of the pre-exposure. Although both of the pre-exposure and the main-exposure are controlled in an electronic shutter scheme in this embodiment, the main-exposure may be controlled in a mechanical shutter scheme. A CMOS type can be utilized as an image sensor photographing the object besides a CCD type. Furthermore, although the focus lens is moved for the purpose of adjusting the focus in this embodiment, since the focus is determined depending on a relative position between the focus lens and the image sensor, the image sensor may be moved in place of or together with the focus lens.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A digital camera comprising:
    an image sensor for generating an image signal by photo-electronically converting an optical image of an object;
    an exposer for exposing said image sensor in response to a timing signal every predetermined time period;
    a reader for reading said image signal generated by exposing of said exposer from said image sensor at a first speed corresponding to said predetermined time period;
    a processor for performing a predetermined process on the basis of said image signal read by said reader at said first speed;
    an instructor for issuing a photographing instruction to photograph a desired object; and
    a first changer for changing a reading speed of said reader to a second speed lower than said first speed,
    wherein the photographing instruction includes a main-exposure instruction that initiates a main exposure operation and an image recording operation, and said first changer initiates the changing of the reading speed of said reader to the second speed after the main-exposure operation is completed and prior to reading the image signal of said desired object from the image sensor, and the reading speed of said reader is maintained at the second speed while reading the image signal of said object from the image sensor.

2. A digital camera according to claim 1, wherein said processor includes an adjuster for adjusting a photographing condition on the basis of said image signal read at said first speed, and a recorder for recording said image signal read at said second speed.

3. A digital camera according to claim 1 or 2, wherein said processor includes a generator for generating a display image signal to be displayed on a display on the basis of said image signal read by said reader.

4. A digital camera according to claim 1 or 2, wherein said exposer performs the main-exposure in response to a timing signal immediately after an input of said main-exposure instruction.

5. A digital camera according to claim 1 or 2, wherein said second speed is one-Nth (N: integer more than 2) of said first speed.

6. A digital camera according to claim 1 or 2, further comprising:
a sampler for performing correlative double sampling on said image signal read from said image sensor at a third speed; and
a second changer for changing a sampling speed of said sampler to a fourth speed lower than said third speed at the same time as a change of said reading speed by said first changer.

7. A digital camera, comprising:
an image sensor driven at a predetermined speed for photographing an object;
a detector for detecting a high-frequency component of an image signal of said object photographed by said image sensor;
an adjuster for adjusting focus on the basis of said high-frequency component;
a determiner for determining whether or not brightness of said object is enough; and
a reducer for reducing a driving speed of said image sensor in response to determining that the brightness of an object being photographed is not enough, wherein the reducer initiates reduction of driving speed of said image sensor prior to beginning a focus adjustment process on the basis of the high frequency component, and maintains the reduction of driving speed during the focus adjustment process.

8. A digital camera according to claim 7, further comprising a calculator for calculating an exposure related parameter in which an optimal exposure amount is obtained on the basis of said image signal, wherein
said determiner determines the brightness by comparing said exposure relating parameter with a predetermined threshold value.

9. A digital camera, comprising:
an image sensor having an imaging surface onto which an optical image of an object scene is irradiated;
a selector for selecting one of a plurality of clocks including a first clock having a first frequency and a second clock having a second frequency which is lower than the first frequency;
a generator for generating a timing signal at an interval corresponding to a frequency of a clock selected by said selector;
an exposer for exposing said imaging surface in response to the timing signal generated by said generator;
a reader for reading from said image sensor an image signal generated on said imaging surface by an exposing process of said exposer at a speed corresponding to a frequency of a clock selected by said selector;
a first setter for setting, prior to a main exposure instruction, said selector to a first state for selecting the first clock;
a processor for executing a predetermined process based on the image signal read out by said reader prior to the main exposure instruction;
a second setter for setting said selector to a second state for selecting the second clock at a timing of completion of a main exposure process which is firstly carried out by said exposer after a reception of the main exposure instruction for recording; and
a recorder for performing a recording process on the image signal read out by said reader after the setting process of said second setter, wherein the image signal on which the recording process is performed by said recorder is an image signal generated by the main exposing process, the predetermined process includes an adjusting process to adjust a photographing condition based on the image signal, and a creating process to create a display image signal for displaying on a monitor based on the image signal, said first setter carries out the setting process at a time of receiving an adjusting instruction to adjust the photographing condition, and said selector continues to select the second clock from a timing of the setting process of said second setter to a timing of the next setting process of said first setter.

10. A digital camera according to claim 9, wherein the photographing condition includes a focus.

11. A digital camera according to claim 9, wherein the photographing condition includes an exposure amount.

12. A digital camera according to claim 9, wherein a frequency of the second clock is 1/N (N: integer more than 1) of a frequency of the first clock.

13. A digital camera according to claim 9, further comprising a sampler for performing a correlation double sampling process on the image signal read out by said reader at a speed corresponding to a frequency of a clock selected by said selector.

14. A digital camera comprising:
an image sensor having an imaging surface onto which an optical image of an object scene is irradiated;
a selector for selecting one of a plurality of clocks including a first clock having a first frequency and a second clock having a second frequency which is lower than the first frequency;
a generator for generating a timing signal at an interval corresponding to a frequency of a clock selected by said selector;
an exposer for exposing said imaging surface in response to the timing signal generated by said generator;
a reader for reading from said image sensor an image signal generated on said imaging surface by an exposing process of said exposer at a speed corresponding to a frequency of a clock selected by said selector;
a first setter for setting said selector to a first state for selecting the first clock at a time of determining a brightness of the object scene based on the image signal read out by said reader; and
a second setter for setting said selector to a second state for selecting the second clock at a time of adjusting a focus based on the image signal read out by said reader in response to a determination result of the brightness of the object scene being insufficient,
wherein the second setter sets said selector to the second state prior to a focus adjustment process and maintains the second state during the focus adjustment process.

15. A digital camera according to claim 14, wherein a frequency of the second clock is 1/N (N: integer more than 1) of a frequency of the first clock.

* * * * *